F. CONSOLI.
VIOLIN FINGER BOARD.
APPLICATION FILED MAR. 4, 1914.

1,126,957.

Patented Feb. 2, 1915.

Witnesses:
James Cronin
M. L. Laughlin

Frank Consoli.
Inventor
By his Attorney Geo. A. Byrne

UNITED STATES PATENT OFFICE.

FRANK CONSOLI, OF BROOKLYN, NEW YORK.

VIOLIN FINGER-BOARD.

1,126,957.  Specification of Letters Patent.  Patented Feb. 2, 1915.

Application filed March 4, 1914. Serial No. 822,277.

*To all whom it may concern:*

Be it known that I, FRANK CONSOLI, a subject of the King of Italy, residing at Brooklyn, county of Kings, State of New York, have invented certain new and useful Improvements in Violin Finger-Boards, of which the following is a specification.

The general object of the invention is to facilitate for beginners, the operation of locating the various notes and positions on the finger board of a violin, viola, cello or base violin. In United States Letters-Patent No. 973719, granted to me October 25th, 1910, I have shown a finger board for violins and the like constructed in accordance with the above stated object. But in that patent the outer surface of the finger board is rendered interrupted by the presence of transverse grooves or recesses partly filled with pieces of metal or the equivalent thereof. I have observed that the interruption in the outer surface of the finger board resulting from leaving unoccupied shallow spaces near the tops of the recesses, interrupts the free sliding movement of the player's fingers over the board and also operates to detract from the tone in instances where the string is pressed into contact with the board at a point directly above any recess.

The present invention consists in forming grooves across the finger board at predetermined distances from each other, and in placing pieces of suitable material as bone, in the grooves, so that the placed pieces will be flush with the outer surface of the board.

Figure 1:
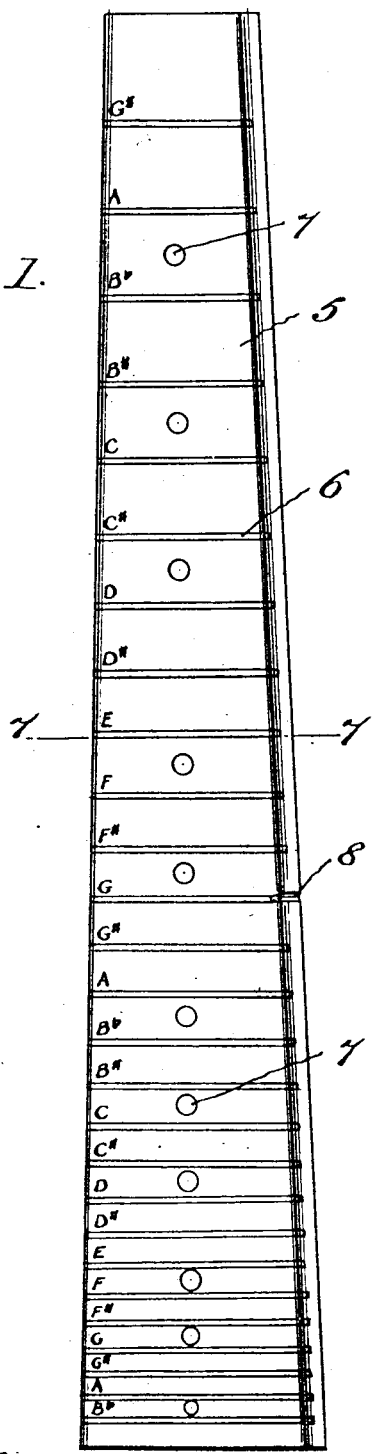
Figure 2:
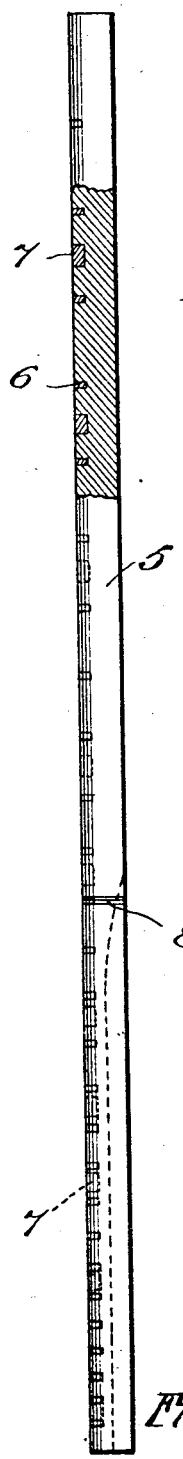
Figure 3:

In the accompanying drawings showing one embodiment of the present invention;

Figure 1 is an enlarged detail perspective view of a finger board *per se*. Fig. 2 is a side elevational view thereof with parts shown broken away for the sake of clearness. Fig. 3 is a cross sectional view taken on the line 3—3 of Fig. 1.

The finger board is indicated generally by 5 and what will be its upper or outer surface when in use, is provided with a series of cross pieces. In the embodiment shown in the drawings the distance between adjacent cross pieces is that which is required in the finger board of a violin in order to obtain proper tones or notes upon pressing the strings with the tips of the fingers at points between adjacent cross pieces. But it will be understood that in the finger boards of musical instruments larger in size than the violin, such as the viola, cello or bass, or in what are known as half or quarter size violins the spacing apart of the cross pieces will be carried out in proportion to the size of the particular finger board.

Each cross piece is formed by filling a transverse open ended groove in the outer or upper face of the finger board with a suitable substance, such as bone, ivory, celluloid, enamel or other suitable material, and colored in marked contrast to the finger board so that the player may readily see the space whereon to place the tip of his finger in instances where the operator desires to be guided by the sense of sight, rather than that of touch in selecting the notes or tones.

Referring now to Fig. 2, the cross pieces which fill the transverse grooves in the board 5 are indicated by 6, and here it will be observed that the upper surfaces of the cross pieces are flush with the corresponding surface of the board 5 so that no obstacles exist on the surface of the finger board to prevent the easy and rapid sliding of the fingers along it. In the embodiment shown the cross pieces 6 are formed of bone. The use of this substance greatly facilitates the player in selecting, by the sense of touch, the desired space on which to apply pressure to a string, and this by reason of the fact that the surface of bone even when perceptibly smoothed or polished, is rendered relatively more rough by the presence of minute outstanding fibers than is ebony of which the ordinary finger board is composed. Hence in the operation of sliding the finger tips over the strings, this slight retarding effect will be felt as the portions of the finger tips bearing on the surface of the finger board pass over the cross pieces.

It will be understood that if material capable of being polished or smoothed to a greater degree than the surface of the finger board, be employed for the cross pieces 6 then an effect opposite to that just described in connection with the use of bone, will be felt by the operator upon his sliding the tips of his fingers over the finger board. Therefore, the principle of the present invention may be stated as, in providing a cross piece whose presence in the finger board of the type of instrument hereinbefore mentioned, will be made manifest to the operator by the sense of touch, and this without perceptibly impeding sliding movement of the finger tips over the surface of the finger board.

Positioned at chosen intervals on the finger board 5 are dots 7 which indicate where the different musical positions are to be found.

What is claimed as new is:

A finger board for violins and like musical instruments having in its upper or outer surface transversely disposed grooves, the said grooves being positioned at chosen intervals and opening through opposite edges of the board, and cross pieces filling said grooves and flush with the outer or upper surface of said board, the exposed surfaces of said cross pieces being different in point of smoothness from the outer or upper surface of the said board for the purpose set forth.

In testimony whereof, I have signed my name to this specification in the presence of two subscribing witnesses, this 26 day of February, 1914.

FRANK CONSOLI.

Witnesses:
ROBT. B. ABBOTT.
BELLA PILLICANO.

Copies of this patent may be obtained for five cents each, by addressing the "Commissioner of Patents. Washington. D. C."